June 23, 1936. H. WILLSHAW ET AL 2,045,429
APPARATUS FOR TREATING BALLS WITH GASES
Filed April 5, 1935 5 Sheets-Sheet 1
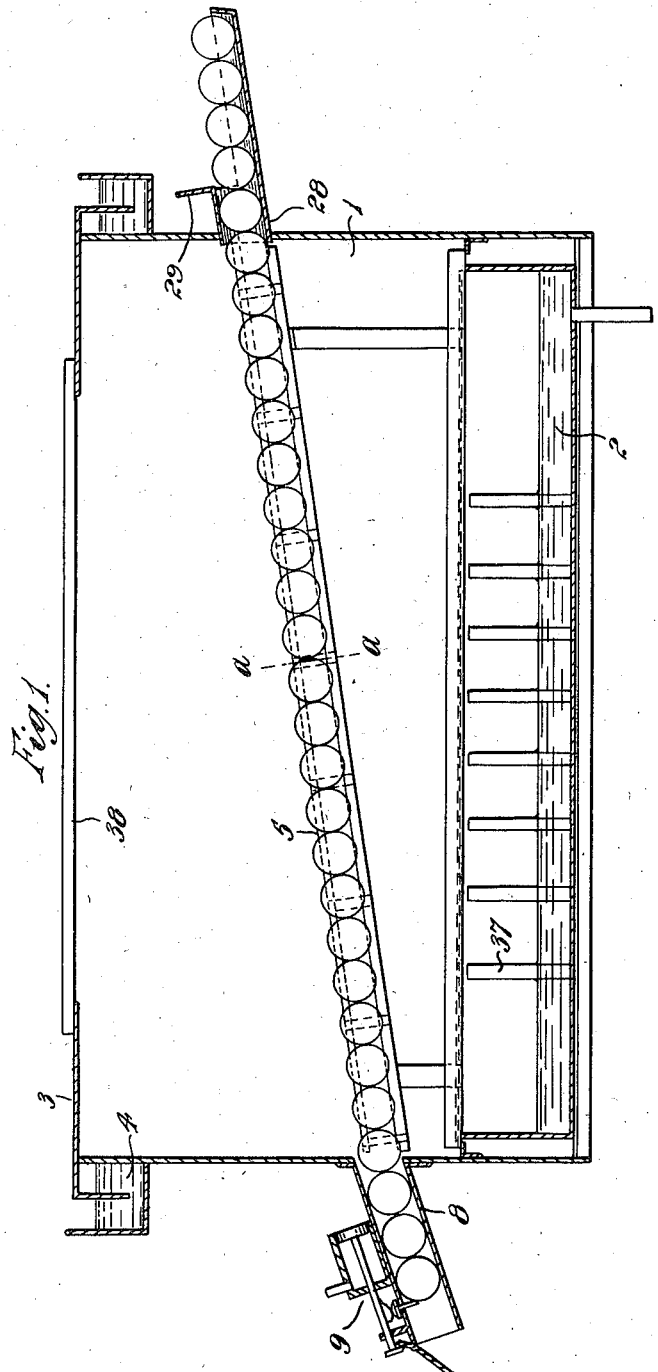

June 23, 1936.  H. WILLSHAW ET AL  2,045,429
APPARATUS FOR TREATING BALLS WITH GASES
Filed April 5, 1935   5 Sheets-Sheet 2
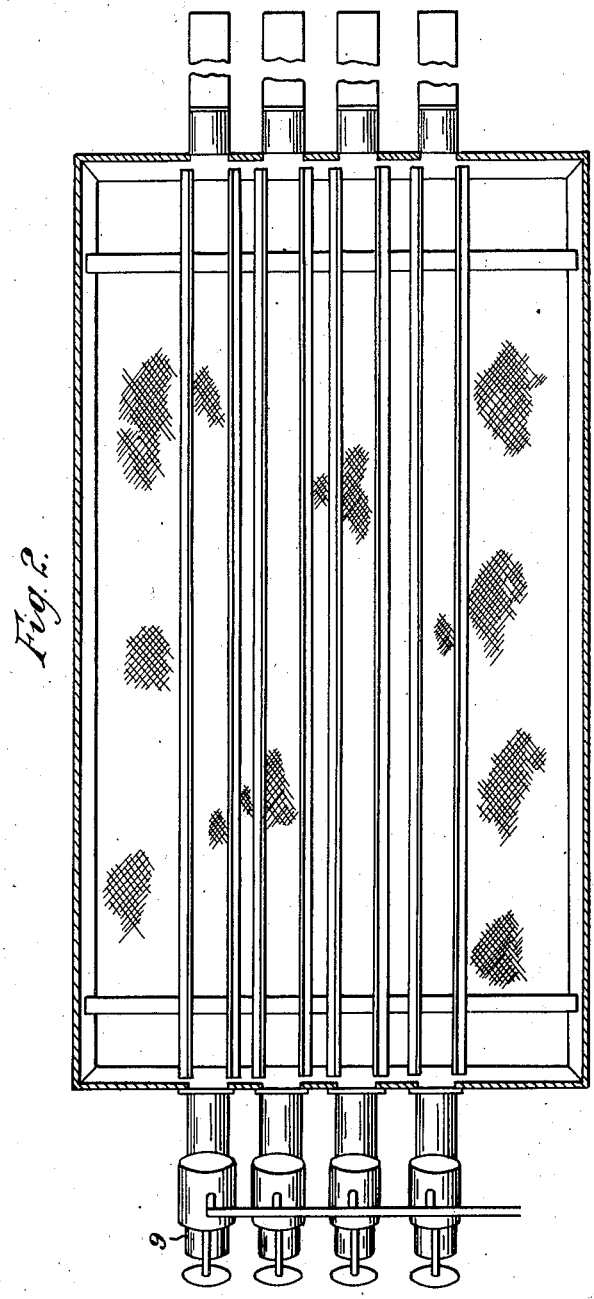

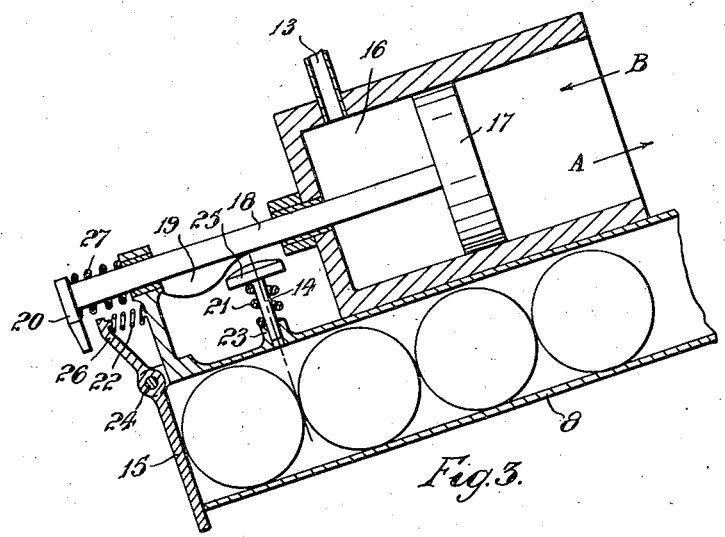
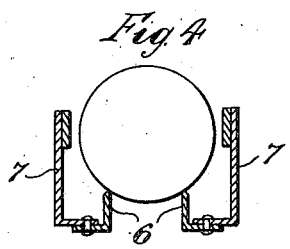

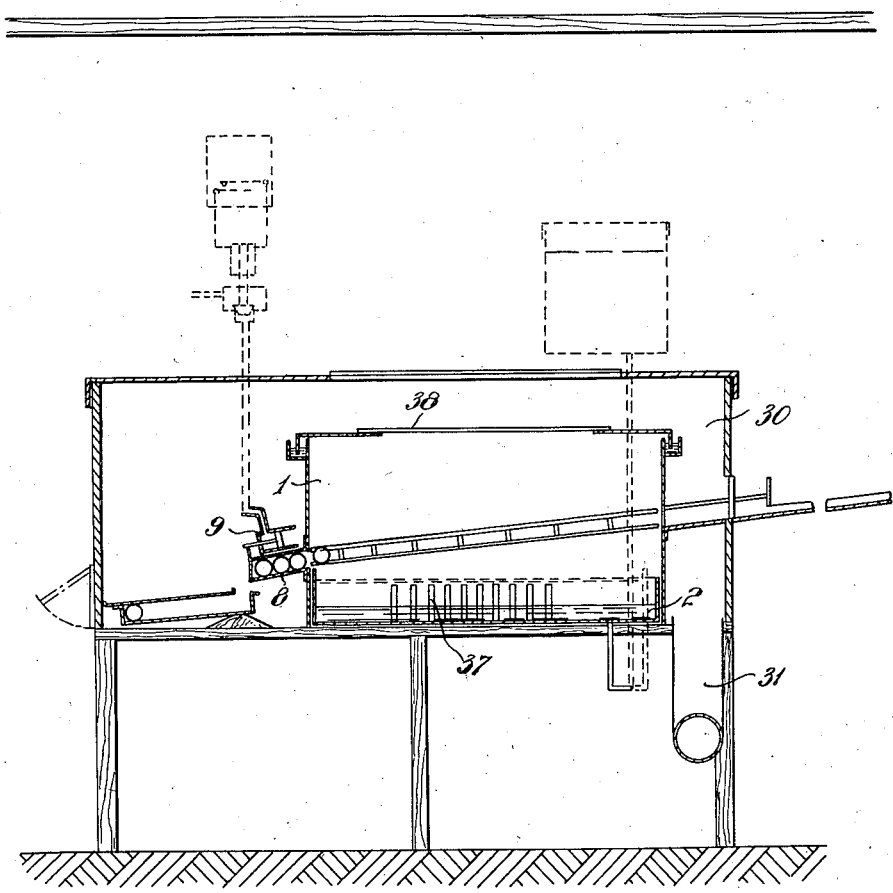

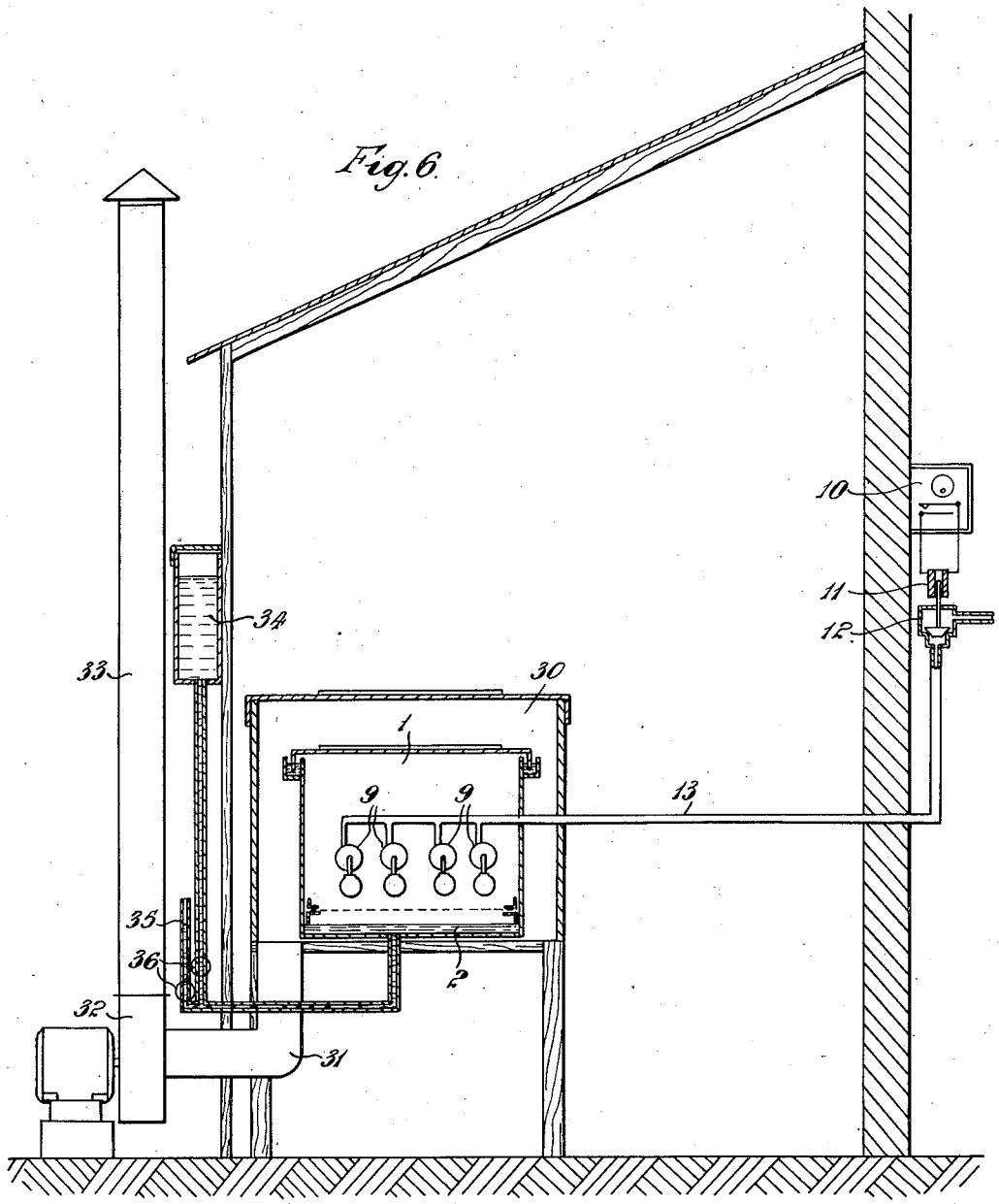

Patented June 23, 1936

2,045,429

UNITED STATES PATENT OFFICE 2,045,429

APPARATUS FOR TREATING BALLS WITH GASES

Harry Willshaw and Douglas Frank Twiss, Wylde Green, Birmingham, and Sydney Neville Goodhall, Marsten Green, Birmingham, and Frederick Arthur Jones, Wylde Green, Birmingham, England, assignors to Dunlop Rubber Company, Limited, Fort Dunlop, Erdington, Birmingham, England, a British company Application April 5, 1935, Serial No. 14,824
In Great Britain March 24, 1934

3 Claims. (Cl. 23—252)

This invention relates to the chemical treatment of rubber or the like balls for example by such processes as are described and claimed in British Patent No. 407,928.

By the term "chemical treatment" we include gas or the like treatment and by the term "rubber or the like balls" we include golf or other balls composed wholly or partly of natural or other rubber or analogous material, for example, gutta percha or balata.

According to this invention, we provide a method for the chemical treatment of rubber or the like balls, wherein a plurality of balls are passed in a continuous succession, hereinafter called a flow, through a chamber, hereinafter called the gas chamber, in which they are submitted to the action of a gas, vapour or the like, hereinafter called the gas, adapted to effect treatment, for example vulcanization or treatment preparatory thereto, and wherein the flow of the balls through said gas chamber is automatically controlled so that each ball is submitted to treatment therein for a pre-determined time.

The invention also includes means, for carrying said method into effect, comprising a gas chamber wherein the balls are submitted to treatment, conveying means whereby said balls are passed through said chamber in said flow, and control means for automatically controlling said flow to pre-determine the time during which each ball remains in said chamber.

Said control means may comprise release mechanism including a detent element which moves into and out of the path of the balls at pre-determined intervals, and also a further element acting interdependently with said detent element, said elements being controlled by suitable timing means.

The conveying means aforesaid may comprise an inclined guideway down which the balls roll under gravity, the release mechanism, which may release one ball at a time, alternately arresting and permitting said gravitational flow at pre-determined intervals.

The arrangement is such that we can provide for comparatively prolonged periods of treatment with balls discharging at comparatively short intervals and further provide that, throughout said prolonged period, the position of the ball surfaces in the gas is intermittently varied at said short intervals—viz, as the balls roll over each time the leading ball discharges.

Various other features and provisions of our invention will become apparent as the description proceeds.

The various features of our invention are illustrated by way of example as embodied in the gas treatment of golf balls, in the accompanying drawings, in which—

Fig. 1 is a cross-sectional side view of the gas chamber and its parts; Fig. 2 is a plan view of Fig. 1; Fig. 3 is an enlarged cross-sectional side view of the release mechanism for the balls; Fig. 4 is an enlarged detail cross-sectional view on the line $a/a$ in Fig. 1; Fig. 5 is a cross-sectional side view showing the gas chamber enclosed in an outer chamber; Fig. 6 is an end view of Fig. 5 mainly in cross section.

The gas is contained in a chamber 1 comprising a metal container formed with a trough 2 for liquid carbon disulphide, which is the chemical used to provide the gas for treating the balls.

Said gas chamber has a loose lid 3 coacting with a liquid seal 4—this prevents escape of gas, and, in case of explosion the lid would simply lift and thus dissipate excess pressure in the gas chamber.

Associated with said gas chamber there is the aforesaid conveying means and control means referred to above.

In the preferred form the arrangement comprises an inclined guideway 5 down which the balls roll under gravity, said guideway comprising a pair of rails 6 which the balls touch only very locally, auxiliary rails 7 being provided to prevent the balls being dislodged from the rails 6.

At the lower end of the guideway 5, there is a discharge chute 8 with which the ball release mechanism, indicated generally by the numeral 9, is associated.

Said release mechanism 9 may be operated in any convenient way; for example, as shown in Figs. 5 and 6, it may be operated by means of a timing device 10 adapted to operate, via a solenoid 11, a valve 12 in a fluid pressure pipe 13 communicating with the release mechanism 9.

In the preferred form, said mechanism comprises a detent element 14 and a further element 15. Said elements act interdependently, and are operated by fluid pressure means comprising a cylinder 16, connecting as shown in Fig. 3 with the pipe 13, and a piston 17 which operates a rod 18 carrying two cams 19 and 20 whereby the respective elements 14 and 15 are operated.

As illustrated particularly in Fig. 3, the element 14 comprises a detent plunger spring loaded at 21 outwardly of the walls of the discharge chute, while the element 15 comprises a flap spring loaded at 22 against the orifices of said discharge chute. The plunger 14 slides vertically in a bearing 23 in the walls of the discharge chute, while the flap 15 is hingedly mounted at 24 on the end of said chute. The cam 19 coacts with a head 25 on the plunger 14 and the cam 20 coacts with an extension 26 of the flap 15.

In operation, starting from the position shown in Fig. 3, the valve 12 is closed, the plunger 14 is held up by the spring 21, and the flap 15 is held down by the spring 22. The timing device 10 then opens the valve 12 via the solenoid 11 and fluid pressure is admitted into the cylinder 16 to force the piston 17 and rod 18 in direction of arrow A.

Upon movement of the rod 18, the cam 19 depresses the detent plunger 14 and immediately afterwards the cam 20 lifts the flap 15. Thus the first ball rolls out of the chute 8, the other balls being held back by the plunger 14. Then the timing device re-closes the valve 12 and permits the fluid in the cylinder 16 to exhaust, whereupon the piston moves in the direction of arrow B, the rod 18 being spring loaded as shown at 27 for that purpose. This movement firstly allows the flap 15 to close and immediately afterwards the plunger 14 to rise, by means of the springs 22 and 21, respectively. The column of balls is then, of course, held back by the flap 15, and it will be seen that the latter serves two purposes, viz it acts as part of the release mechanism and also as a gas-tight closure of the discharge chute 8—to prevent continual escape of gas from the gas chamber.

As shown in the drawings, we also preferably use a feed chute 28 at the upper end of the main guideway 5, and a further flap 29 may be associated with this chute, said flap being adapted to act as a substantially gas-tight closure of said chute at such times as the balls themselves do not serve that purpose.

In operation, the feed chute 28 is filled with balls from time to time and the remainder of the process proceeds automatically: there is a complete column of balls extending from the chute 28 to the release mechanism 9 and as the latter operates at intervals one or more balls pass out and the other balls roll forward a little in continuance of their timed journey through the gas chamber.

The present invention may be embodied in association with any or all of the provisions of our copending application Ser. No. 14,298, filed April 2, 1935 which application is concerned with keeping the immediate vicinity of the place at which the process is carried out clear of gas.

Recourse may be had to that application for further details, but mention may be made here of the fact that, when the gas used is of a noxious or dangerous nature, the gas chamber 1 is preferably disposed, see Figs. 5 and 6, within an outer chamber 30, which is connected via a conduit 31 to a suction fan 32, gas escaping from the gas chamber 1 passing into the outer chamber 30 from which it is continuously withdrawn by the fan 32 and discharged safely into the open air via the chimney 33.

Further, when the gas used is of a highly combustible or ignitable nature, care is preferably taken to ensure that any mechanism likely to contact said gas operate without heat or sparks, and to this end the release mechanism 9 is operated by fluid pressure means as aforesaid, and the solenoid 11 is disposed outside the danger zone as shown for example in Fig. 6.

The invention of said copending case provides means for replenishing the trough 2 from a tank 34 in the open air, a gauge 35 and valves 36 being provided to maintain the level in said trough from a place apart.

It is not to be construed that we confine ourselves to the details of the foregoing or to any one particular embodiment of our invention.

For example, although the automatic control means described above are specially suitable in the particular circumstances referred to, we may use other forms of automatic control and the same may be operated by electrical, fluid pressure, or mechanical means, or by a combination of such means. For instance, we may use a mechanical system comprising rotating cam mechanisms operating either in place of the fluid pressure mechanism operated by the separate timing device aforesaid, or so as to dispense with a separate timing device entirely.

Again we do not necessarily use chutes as aforesaid as the guideway 5 may be fed and may discharge in other ways: for example, we may use a hopper at the feed end, and at the discharge end we may associate the detent with the guideway itself.

We may arrange for the treatment of only one stream or column of balls at a time or for the treatment of a plurality of streams simultaneously: for example, as shown in Fig. 2 we may use a plurality of guideways 5 and associated parts, such as the chutes 8 and 28 side by side, the automatic release mechanism being common to a plurality of guides, separate for each guide, or partly common and partly separate.

And of course we may make various detail refinements as, for example, wicks or other porous means 37, either fabric or otherwise, may be used to assist gasification and/or to bring the gas diffusing surface as near as possible to the balls. And suitable windows, as 38, or other inspection means may be provided in the lid or walls of the gas chamber.

Having described our said invention, we claim—

1. Apparatus for treating spherical objects in succession with a gaseous medium which comprises a gas chamber, means for supplying treating gas to said chamber, conveying means so constructed that said spherical objects may roll through said chamber in continuous succession, said means comprising an entrance chute so shaped to closely fit and be closed by the passing spherical objects, a closure flap for said entrance chute, guide rails for guiding said spherical objects through said chamber, a discharge chute for and control means for controlling the passage of spherical articles through said discharge chute, said control means including a closure flap member so disposed at the bottom of said chute as to seal said chute when closed and permit the passage of said spherical objects when open and fluid pressure means comprising a cylinder and a piston therein operating a rod connected to said closure flap member and adapted to open and close said flap member, a cam on said rod and a detent element so operated by said cam upon movement of said rod as to prevent the downward movement of objects in said chute other than the one next adjacent the said flap member when said flap is open and to release said objects when said flap is closed.

2. Apparatus for the treating of spherical objects with a gaseous medium comprising a gas treating chamber having inlet and outlet openings through the walls thereof, said inlet opening being disposed at a higher horizontal level than said outlet opening, each of said openings being round and of a diameter approximating that of the said objects, an inclined trackway within said chamber connecting the two said openings, said trackway being adapted to permit the gravity passage of a plurality of said objects in successive and adjacent alignment from one opening to the other, means to supply a treating gas to said chamber, means to feed a continuous succession of objects to said inlet opening and means to periodically advance said objects through said chamber, said means comprising a discharge chute forming a continuation of said trackway on the outside of the said chamber, a hinged flap member so disposed at the bottom of said chute as to seal said chute when closed and permit the passage of said spherical objects when open and means to periodically open and close said flap member to permit the object next adjacent the same to pass therethrough, said means including a cylinder and a piston therein operating a rod connected to said closure flap member and adapted to open and close said flap member, a cam on said rod and a detent element so operated by said cam upon movement of said rod as to prevent the downward movement of objects in said chute other than the one next adjacent the said flap member when said flap is open and to release said objects when said flap is closed.

3. Apparatus for treating spherical objects with a gaseous medium comprising a gas treatment chamber, means to supply a treating gas to the said chamber, inlet and outlet openings in said chamber to permit the said objects to enter and leave the said chamber, said openings each being round and of a diameter approximating the diameter of said objects, the said inlet opening being disposed at a higher horizontal level than the said outlet opening, means to feed a continuous succession of said objects to the said inlet opening, a flap closure means for said inlet opening operative to close the same in the absence of an object in said inlet opening, an inclined guideway within said chamber to receive the said objects as they pass through the said inlet opening and to conduct the said objects to the said outlet opening, and means to discharge the said objects through said outlet opening at determined intervals, said means comprising an inclined chute leading downwardly from said outlet opening adapted to receive a plurality of objects from said outlet opening, a hinged flap member so disposed at the bottom of said chute as to seal said chute when closed and permit the passage of said spherical objects when open and fluid pressure means comprising a cylinder and a piston therein operating a rod connected to said closure flap member and adapted to open and close said flap member, a cam on said rod and a detent element so operated by said cam upon movement of said rod as to prevent the downward movement of objects in said chute other than the one next adjacent the said flap member when said flap is open and to release said objects when said flap is closed.

HARRY WILLSHAW.
DOUGLAS FRANK TWISS.
SYDNEY NEVILLE GOODHALL.
FREDERICK ARTHUR JONES.